US010823192B2

(12) United States Patent
Schwarz et al.

(10) Patent No.: US 10,823,192 B2
(45) Date of Patent: Nov. 3, 2020

(54) GAS TURBINE ENGINE WITH SHORT INLET AND MISTUNED FAN BLADES

(71) Applicant: United Technologies Corporation, Farmington, CT (US)

(72) Inventors: Frederick M. Schwarz, Glastonbury, CT (US); Daniel L. Gysling, South Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1133 days.

(21) Appl. No.: 14/974,151

(22) Filed: Dec. 18, 2015

(65) Prior Publication Data

US 2017/0175761 A1    Jun. 22, 2017

(51) Int. Cl.
*F04D 29/32* (2006.01)
*F02K 3/06* (2006.01)
(Continued)

(52) U.S. Cl.
CPC ........... *F04D 29/327* (2013.01); *F01D 5/027* (2013.01); *F01D 5/10* (2013.01); *F01D 5/147* (2013.01); *F01D 5/16* (2013.01); *F01D 5/26* (2013.01); *F01D 5/3007* (2013.01); *F02C 7/04* (2013.01); *F02C 7/36* (2013.01); *F02K 3/06* (2013.01);
(Continued)

(58) Field of Classification Search
CPC ........ F01D 5/30; F01D 5/3007; F01D 5/3015; F04D 29/322; F04D 29/327; F04D 29/34
See application file for complete search history.

(56) References Cited

U.S. PATENT DOCUMENTS 2,271,971 A * 2/1942 Doran ................... F01D 5/3007
416/216
3,400,912 A * 9/1968 Carta ........................ F01D 5/30
416/220 R
(Continued)

FOREIGN PATENT DOCUMENTS

EP          2617945 A1      7/2013
EP          2617946 A2      7/2013
WO       2014137685 A1     9/2014

OTHER PUBLICATIONS

European Search Report for European Application No. 16205138.7 dated May 3, 2017.

*Primary Examiner* — Nathaniel E Wiehe
*Assistant Examiner* — Brian O Peters
(74) *Attorney, Agent, or Firm* — Carlson, Gaskey & Olds, P.C.

(57) ABSTRACT

A gas turbine engine comprises a fan rotor having fan blades received within an outer nacelle. The fan blades are provided with at least a first type having a first natural frequency, and a second type having a second natural frequency. The fan rotor has a first mount structure intended for the first type and a distinct second mount structure intended for the second type. The first type of fan blade fits into the first mount structure intended for the first type, but there is a first obstruction preventing the first type of fan blade from being placed into the second mount structure intended for the second type. The second type of fan blade fits into the second mount structure intended for the second type, but there is a second obstruction preventing the second type of fan blade from being placed into the first mount structure intended for the first type.

16 Claims, 5 Drawing Sheets

(51) Int. Cl.
*F04D 29/66* (2006.01)
*F04D 29/52* (2006.01)
*F02C 7/36* (2006.01)
*F04D 19/00* (2006.01)
*F04D 29/38* (2006.01)
*F01D 5/16* (2006.01)
*F01D 5/10* (2006.01)
*F01D 5/14* (2006.01)
*F01D 5/30* (2006.01)
*F01D 5/26* (2006.01)
*F02C 7/04* (2006.01)
*F01D 5/02* (2006.01)

(52) U.S. Cl.
CPC ......... *F04D 19/002* (2013.01); *F04D 29/322* (2013.01); *F04D 29/384* (2013.01); *F04D 29/522* (2013.01); *F04D 29/666* (2013.01); *F04D 29/668* (2013.01); *F05D 2220/32* (2013.01); *F05D 2220/36* (2013.01); *F05D 2250/73* (2013.01); *F05D 2260/40311* (2013.01); *F05D 2260/961* (2013.01)

(56) References Cited

U.S. PATENT DOCUMENTS

| | | | | |
|---|---|---|---|---|
| 4,968,217 A | * | 11/1990 | Newton | B64C 11/32 416/147 |
| 5,915,403 A | * | 6/1999 | McConachie | B64D 33/02 137/15.1 |
| 5,993,161 A | | 11/1999 | Shapiro | |
| 6,471,482 B2 | | 10/2002 | Montgomery et al. | |
| 7,383,136 B1 | | 6/2008 | Griffin et al. | |
| 8,043,063 B2 | | 10/2011 | Kelly et al. | |
| 8,418,953 B2 | * | 4/2013 | Smith | F02C 7/04 137/15.1 |
| 8,876,472 B2 | * | 11/2014 | Dijoud | F01D 5/141 416/2 |
| 8,888,459 B2 | * | 11/2014 | Noble | F01D 5/22 416/193 A |
| 8,920,127 B2 | * | 12/2014 | McCaffrey | F01D 5/284 415/194 |
| 2005/0254958 A1 | | 11/2005 | Stone | |
| 2013/0177427 A1 | | 7/2013 | Kayser | |
| 2015/0044028 A1 | | 2/2015 | Lord et al. | |

\* cited by examiner

GAS TURBINE ENGINE WITH SHORT INLET AND MISTUNED FAN BLADES

BACKGROUND OF THE INVENTION

This application relates to a gas turbine engine having mistuned fan blades.

Gas turbine engines are known and typically include a fan delivering air into a bypass duct as propulsion air and into a compressor as core flow. The air is compressed in the compressor and delivered into a combustor where it is mixed with fuel and ignited. Products of this combustion pass downstream over turbine rotors, driving them to rotate.

Recently, a gear reduction has been incorporated between a fan drive turbine and the fan rotor. This has increased the design freedom for the gas turbine engine designer. In particular, the fan can now be made to rotate slower than the turbine. With this change, the diameter of the fan has increased.

It has recently been proposed to provide a gas turbine engine, where the inlet or area of a surrounding housing or nacelle forward of the fan rotor, is shorter than in the past. Providing a shorter inlet reduces the weight of the engine and also reduces external drag. Other benefits include reducing a bending moment and corresponding load on an engine structure during flight conditions such as takeoff. Further, by making the inlet shorter, the overall envelope of the engine is reduced.

However, the shorter inlets raise various challenges.

One challenge has to do with fan blade resonant stress. As the fan blades rotate, they are subject to stresses and, particularly, have challenges when the engine is operating such that flow non-uniformities, often termed inlet distortions, result in periodic excitation at or near the natural frequency of the fan blade. For an assembly of fan blades with similar vibrational characteristics, i.e., a tuned fan blade assembly, adjacent fan blades can contribute to the challenges on each fan blade, as their operation is interrelated. These challenges can become particularly acute in a short inlet fan which can have increased levels of inlet distortion compared to longer inlets.

It has been proposed in other engine types to mistune the fan blades such that adjacent fan blades have different natural frequencies. This decouples the interaction between the adjacent blades and can result in a significant reduction in resonant stress compared to a tuned fan blade assembly. Such intentionally mistuned fans have primarily been utilized in integrally bladed rotors such as for military engines.

SUMMARY OF THE INVENTION

In a featured embodiment, a gas turbine engine comprises a fan rotor having fan blades received within an outer nacelle. The fan blades are provided with at least a first type having a first natural frequency, and a second type having a second natural frequency. The fan rotor has a first mount structure intended for the first type and a distinct second mount structure intended for the second type. The first type of fan blade fits into the first mount structure intended for the first type, but there is a first obstruction preventing the first type of fan blade from being placed into the second mount structure intended for the second type. The second type of fan blade fits into the second mount structure intended for the second type, but there is a second obstruction preventing the second type of fan blade from being placed into the first mount structure intended for the first type.

In another embodiment according to the previous embodiment, a distance is defined from a plane defined by leading edges of the fan blades to an axial location of a forwardmost part of the nacelle, and an outer diameter of the fan blades being defined, and a ratio of the distance to the outer diameter is between about 0.2 and about 0.5.

In another embodiment according to any of the previous embodiments, the nacelle is formed with droop such that one portion extends axially further from the fan blades than does another portion, and wherein a distance measured to the one portion of the nacelle will still result in a ratio less than about 0.45, and the distance being measured to the another portion of the nacelle still results in the ratio being greater than about 0.20.

In another embodiment according to any of the previous embodiments, the ratio is greater than or equal about 0.25.

In another embodiment according to any of the previous embodiments, the ratio is greater than or equal to about 0.30.

In another embodiment according to any of the previous embodiments, the ratio is less than or equal to about 0.40.

In another embodiment according to any of the previous embodiments, a fan drive turbine drives the fan rotor through a gear reduction.

In another embodiment according to any of the previous embodiments, a gear ratio of the gear reduction is greater than about 2.3.

In another embodiment according to any of the previous embodiments, the mount structure is the rotor, and a portion of the first type of fan blade is received in a first type of slot in the rotor, and a portion of the second type of fan blade is received in a second type of slot in the rotor which is distinct from the slot of the first type of slot.

In another embodiment according to any of the previous embodiments, the portion of the first type of fan blade is a first flange. The portion of the second type of fan blade is a second flange which is positioned at a distinct location as compared to the first flange. The slots of the first type have an opening to receive the first flange. The slots of the second type have an opening to receive the second flange at the distinct location.

In another embodiment according to any of the previous embodiments, the first flange on the first type of fan blade extends in a first circumferential direction and the second flange on the second type of fan blade extends in an opposed circumferential direction.

In another embodiment according to any of the previous embodiments, the first flange on the first type of fan blade is at a radial position that is different from the second flange on the second type of fan blade.

In another embodiment according to any of the previous embodiments, a first flange is received in first slots formed in one of the rotor and the first type of fan blades, and the other of the rotor and the first type of blades is formed with a first groove to receive the first flange.

In another embodiment according to any of the previous embodiments, a second flange is received in second slots formed in one of the rotor and the second type of fan blades, and the other of the rotor and the second type of blades is formed with a second groove to receive the second flange, In another embodiment according to any of the previous embodiments, the first grooves and the first flange for the first type of fan blade, and the second grooves and the second flange for the second type of fan blade are at distinct locations.

In another embodiment according to any of the previous embodiments, the first flanges and the second flanges are formed in the rotor.

In another embodiment according to any of the previous embodiments, the first flanges and the second flanges are formed, respectively, on the first type of fan blades and the second type of fan blades.

In another embodiment according to any of the previous embodiments, the first and second types of fan blades each has a dovetail with circumferential sides, and the circumferential sides are formed differently for each of the first and second type of fan blades.

In another embodiment according to any of the previous embodiments, an angle of at least one of the circumferential sides along which at least one of the circumferential side extends is different for the first type of fan blade and second type of fan blade.

In another embodiment according to any of the previous embodiments, the circumferential sides of the first type of fan blades and the second type of fan blades have a radially higher circumferential side and a radially lower circumferential side, and the higher and lower circumferential sides are reversed between the first type of fan blades and second type of fan blades.

These and other features may be best understood from the following drawings and specification.

DETAILED DESCRIPTION

Figure 1:
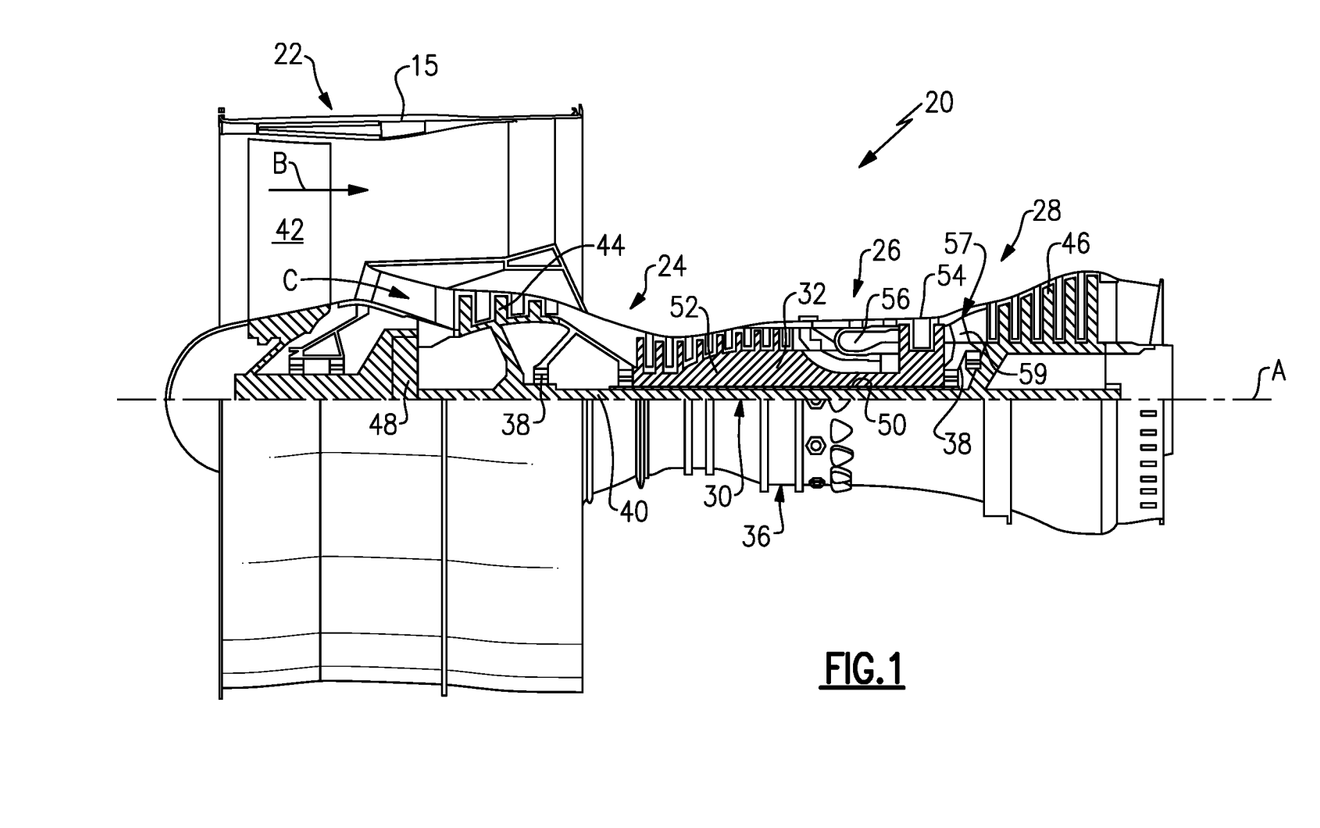
FIG. 1 schematically shows an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFCT')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
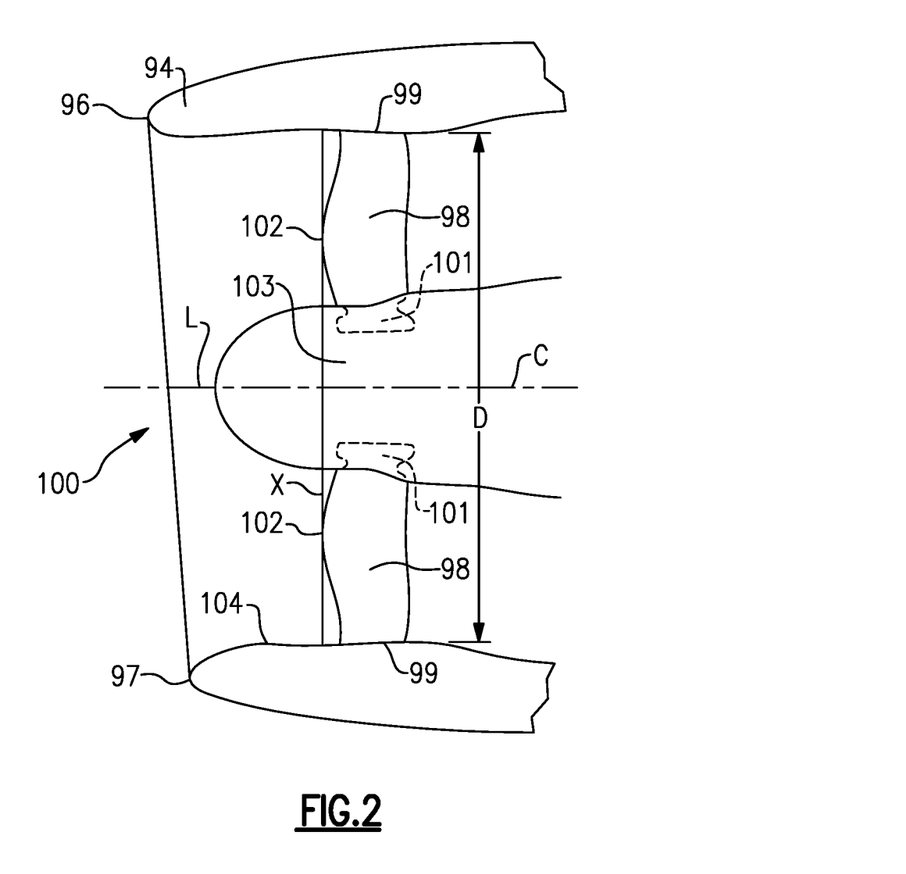
FIG. 2 shows a challenge in short inlet engines.

FIG. 2 shows an engine known as a short inlet engine. As shown, a nacelle 94 has forwardmost ends 96 and 97. As can be seen, the forwardmost ends do not necessarily lie in a common plane perpendicular to a center axis of the engine. Rather, point 96 is further forward than point 97. Fan blades 98 have an outer diameter 99. The nacelle 94 is shown to have a radially inwardly extending innermost point 104. Point 104 is inward of the outer diameter 99 of the fan blade 98. As shown schematically, the fan blades have a root section or dovetail 101 received in a hub 103 of the fan rotor.

The short inlet may be defined by a distance L measured from: (a) a plane X perpendicular to a central axis C, which plane also being tangent to a leading edge or forward most point 102 of the fan blade 9 to (b) a plane defined by the forwardmost points (including ends 96, 97) of the nacelle 948. A ratio is defined of L:D with D being the outer diameter of the fan blades 98.

In one embodiment L:D is between about 0.2 and about 0.50, or even 0.45. Alternatively, the ratio may be greater than about 0.25 and in alternative embodiments greater than about 0.30. In embodiments, the ratio of L:D may be less than about 0.40.

As can be appreciated, the L:D quantity would be different if measured to the forwardmost point 96 than to the forwardmost point 97. However, in embodiments the ratio at the forwardmost point 96 would still be less than about 0.45, and the ratio at the shortest forwardmost point 97 would still be greater than about 0.2.

Stated another way, the forwardmost end of said nacelle extends outwardly for varying extents across the circumference of the nacelle, and the ratio of the L:D for all portions of the varying distance of the nacelle being between about 0.2 and about 0.45.

The engine shown in FIG. 2, wherein the end 96 extends outwardly for a greater distance than the end 97 is said to have droop. In such an engine, the inlet leading to the fan blades 98 is not only short at the longer end 96, but especially short at the shorter end 97. There is a challenge from air distortion in the air reaching the fan blade 98, and this increases the stresses on the blades.

Figure 3A:
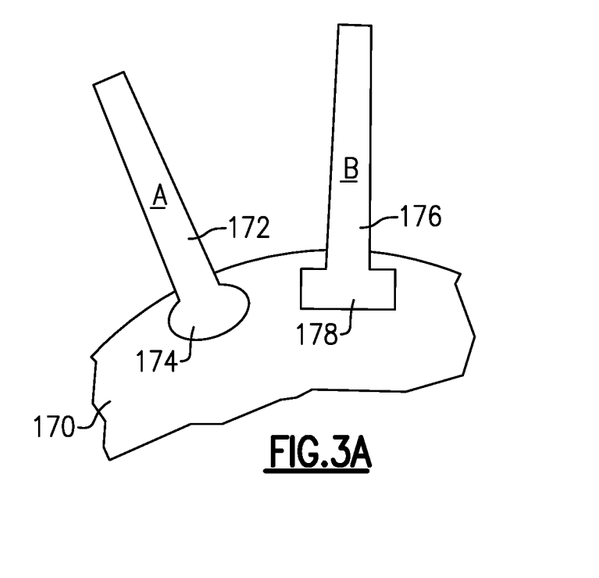
FIG. 3A shows a first embodiment.

Thus, as shown in FIG. 3A, it is proposed to have a fan rotor 170 provided with at least two distinct designs of fan blades 172(A) and 176(B). In an embodiment, fan blades 172 are designed to have a first natural frequency, while fan blades 176 are designed to have a second natural frequency. In embodiments, nominal natural frequency differences between the two types would be at least 2% for the first two lowest frequency blade-only structural modes. Generally, the two types are alternated across the circumference of rotor 150. While the rotor 170 is shown with two types of fan blades, rotors incorporating additional numbers of fan blades are also envisioned within the scope of this disclosure.

There would be challenges for a fan rotor such as fan rotor 170. In particular, it would not be desirable to have a fan blade 172 inadvertently inserted into the hub 170 at a location intended for a fan blade 176, or vice versa.

FIG. 3A schematically shows the dovetail 174 associated with the blade 172 being distinct from the dovetail 178 associated with the blade 176. Of course, the hubs 170 would have a broach or slot which corresponds to the shapes of dovetails 174 and 178. It should be understood that the illustrations are not actual dovetail shapes, but rather merely serve to show that the overall shape of the dovetail may be made differently.

Figure 3B:
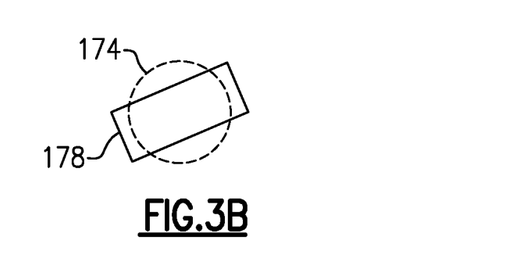
FIG. 3B shows a detail.

As shown in FIG. 3B, the dovetail 174 would not be able to fit into the slot associated with the dovetail 178, and vice versa. In this manner, the potential for inadvertently putting a blade into the wrong slot or broach is addressed.

Figure 4:
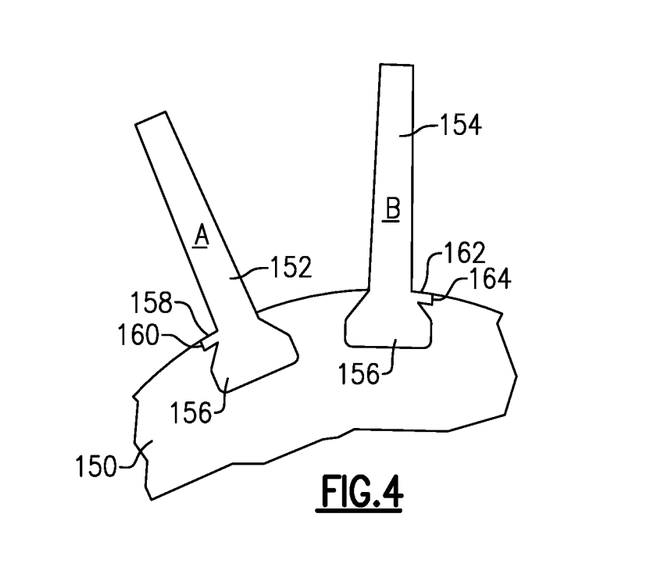
FIG. 4 shows another embodiment.

FIG. 4 shows an embodiment 150 wherein a first type blade 152(A) and a second type blade 154(B) are shown. Here, the dovetail 156 of blade 152 includes a flange or ear 158 extending in a first circumferential direction from the blade 152, and fitting into a slot 160 in the hub 150. A second flange 162 extends from the second type blade 154 in an opposed circumferential direction and fits into a slot 164. Again, the rotor 150 would be provided with appropriate slots to receive the dovetails 156 and the flanges 158/162. Again, this would eliminate the possibility of inadvertently putting the wrong blade at an improper location on the hub 150.

Figure 5:
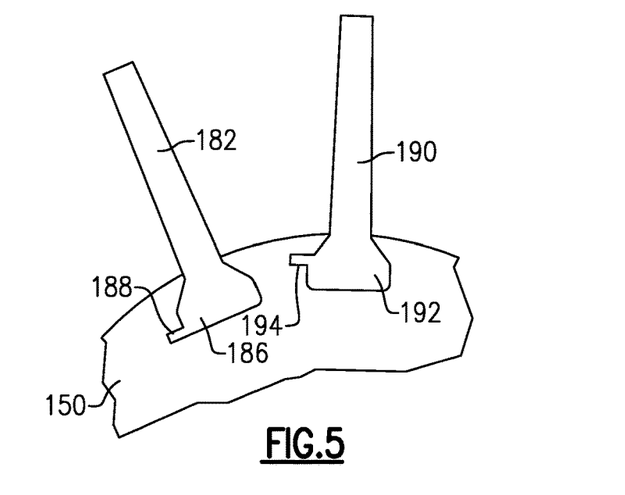
FIG. 5 shows yet another embodiment.

FIG. 5 shows another embodiment wherein a hub 150 receives two types of fan blades 182 and 190. A flange 188 extends from the dovetail 186 at a radially inner location. On the blade type 190, the dovetail 192 has a flange 194 extending at a distinct radial location into a slot in the hub 150. Again, this would prevent the fan blades from being inadvertently placed into the wrong slot or broach.

Figure 6:
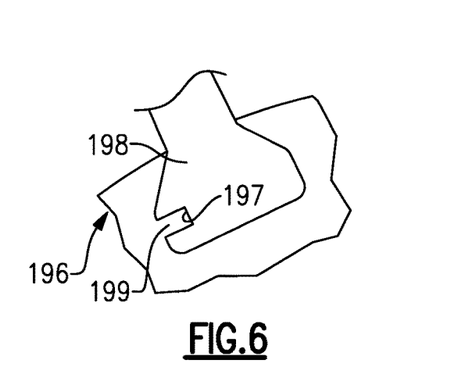
FIG. 6 shows yet another embodiment.

FIG. 6 shows a hub 196 wherein a dovetail 198 receives a flange 199 from the hub 196 into an opening 197 in the dovetail 198. This embodiment is intended to show that while the projections in all other Figures are shown extending outwardly of the blade, the projections could also extend from the hubs into the blades.

Figure 7:
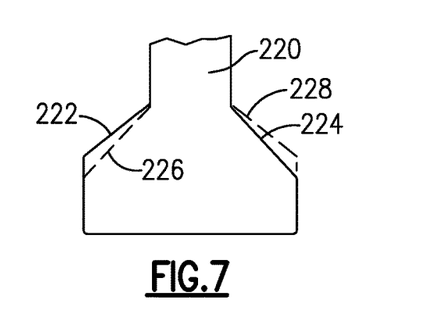
FIG. 7 shows yet another embodiment.

FIG. 7 shows an embodiment wherein the blades 220 have side surfaces wherein a first blade type has a radially outer surface 222 and a radially inner side surface 224 at opposed circumferential sides. The second type blade has the radially inner side surface 226 on the opposed circumferential side and the radially outer surface 228 on the circumferential side associated with the radially inner side wall 224 of the first blade type. Again, this will prevent inadvertent positioning of the wrong type blade into a particular slot.

Figure 8:
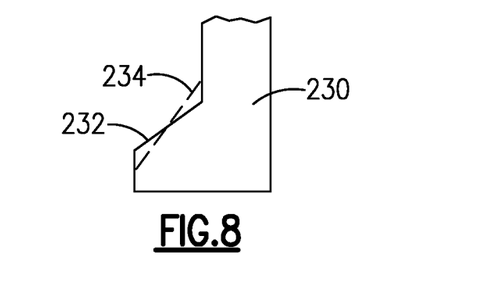
FIG. 8 shows yet another embodiment.

FIG. 8 shows yet another embodiment 230 wherein the side walls on a first blade type 232 and the side walls on a second blade type 234 extend along distinct angles. Again, the distinct angles are such that there was be an obstruction to placing an improper blade type into a slot.

Figure 9:
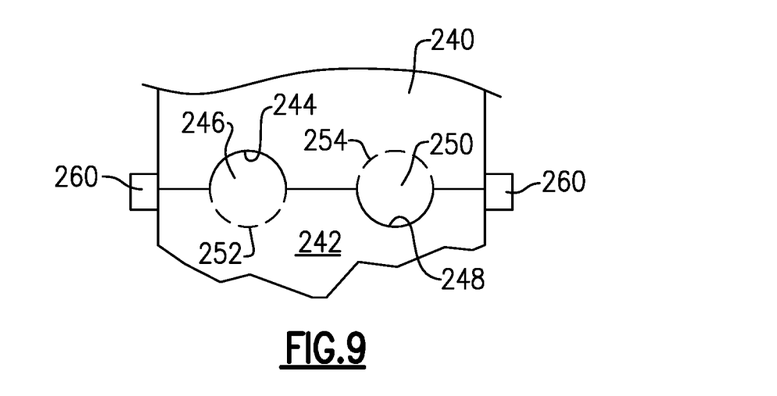
FIG. 9 shows yet another embodiment.

FIG. 9 is a cross-sectional view along an axial length of a blade 240. That is, it shows a radially inner surface between the blade and hub. The hub 242 has an extending portion 246 extending into a groove 244 in the bottom of the dovetail for the blade 240. An extending portion 250 from the first type blade extends outwardly into a groove 248 in the hub 242.

For the second blade type, the position of the extension and slot are reversed as shown at 252 and 254. Again, there would be an obstruction to placing the wrong blade type in the wrong slot.

Figure 10:
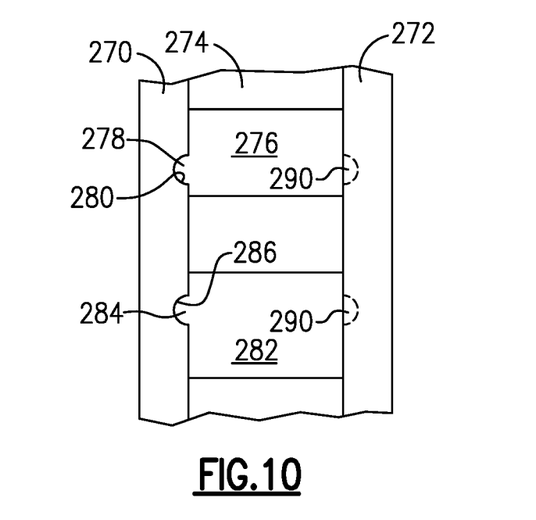
FIG. 10 shows yet another embodiment.

FIG. 9 also shows a feature wherein retention rings 260 are placed at the axial ends of both the blade 240 and hub 242. This supports an understanding of the embodiment shown in FIG. 10. A ring 270 and a ring 272 are shown at ends of a rotor 274 securing a first blade type 276. An extension 278 extends into a groove 280 in ring 270. This extension is at one circumferential extent on the blade type 276. The second blade type 282 has its extension 284 extending into a groove 286 on the ring 270 at the opposed circumferential end. It should be understood that with this embodiment, the ring 270 would require some indexing feature such that its screws 280 and 286 are proper aligned. As shown in phantom at 290, the extension can also extend into the rear locking ring 272. With this embodiment, the wrong blade type could perhaps be placed in a slot, but cannot be secured.

Again, with regard to all of the embodiments, the suggestion shown in FIG. 6 wherein the extension could be in the lock ring, and extend into grooves in the blades would also hold true.

What is common for the embodiments of FIGS. 3-6 is mount structure is provided with structure and the two fan blade types are provided with structure that would prevent one fan blade type from being inadvertently placed into a slot intended for the other fan blade type. There is a mechanical obstruction to such inadvertent insertion. The mount structure could be the hub slot or a retention ring.

It should also be understood that the shapes of the obstructions may look different from those illustrated.

Although various embodiments of this invention have been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a fan rotor having fan blades received within an outer nacelle; and
said fan blades being provided with at least a first type having a first natural frequency, and a second type having a second natural frequency and said fan rotor having a first mount structure intended for said first type and a distinct second mount structure intended for said second type, and said first type of fan blade fitting into the first mount structure intended for said first type, but there being a first obstruction preventing said first type of fan blade from being placed into the second mount structure intended for said second type, and said second type of fan blade fitting into the second mount structure intended for said second type, but there being a second obstruction preventing said second type of fan blade from being placed into the first mount structure intended for said first type; and
wherein a distance is defined from a plane defined by leading edges of said fan blades to an axial location of a forwardmost part of said nacelle, and an outer diameter of said fan blades being defined, and a ratio of said distance to said outer diameter is between 0.2 and 0.5.

2. The gas turbine engine as set forth in claim 1, wherein said nacelle is formed with droop such that one portion extends axially farther from said fan blades than does another portion, said one portion being said forwardmost part, and wherein said distance measured to the one portion of said nacelle will still result in a ratio less than 0.45, and a second distance being measured to the another portion of said nacelle still results in said ratio being greater than 0.20.

3. The gas turbine engine as set forth in claim 1, wherein said ratio being greater than or equal 0.25.

4. The gas turbine engine as set forth in claim 3, wherein said ratio being greater than or equal to 0.30.

5. The gas turbine engine as set forth in claim 1, wherein said ratio being less than or equal to 0.40.

6. The gas turbine engine as set forth in claim 1, wherein a fan drive turbine driving said fan rotor through a gear reduction.

7. The gas turbine engine as set forth in claim 6, wherein a gear ratio of said gear reduction being greater than 2.3.

8. The gas turbine engine as set forth in claim 1, wherein a first flange is received in first slots formed in one of said fan rotor and said first type of fan blades, and the other of said rotor and said first type of blades is formed with a first groove to receive said first flange.

9. The gas turbine engine as set forth in claim 8, wherein a second flange is received in second slots formed in one of said fan rotor and said second type of fan blades, and the other of said fan rotor and said second type of blades is formed with a second groove to receive said second flange.

10. The gas turbine engine as set forth in claim 9, wherein said first groove and said first flange for said first type of fan blade, and said second groove and said second flange for said second type of fan blade are at distinct locations.

11. The gas turbine engine as set forth in claim 9, wherein said first flange and said second flange are formed in said fan rotor.

12. The gas turbine engine as set forth in claim 9, wherein said first flange and said second flange are formed, respectively, on said first type of fan blades and said second type of fan blades.

13. The gas turbine engine as set forth in claim 1, wherein said first and second types of fan blades each has a dovetail with circumferential sides, and said circumferential sides being formed differently for each of said first and second type of fan blades, wherein an angle of at least one of said circumferential sides is different among said first type of fan blade and second type of fan blade.

14. The gas turbine engine as set forth in claim 1, wherein said first and second types of fan blades each has a dovetail with circumferential sides, and said circumferential sides being formed differently for each of said first and second type of fan blades, wherein said circumferential sides of said first type of fan blades and said second type of fan blades have a radially higher circumferential side and a radially lower circumferential side, and the higher and lower circumferential sides are reversed among said first type of fan blades and second type of fan blades.

15. The gas turbine engine as set forth in claim 1, wherein said first natural frequency has a blade-only structural mode and said second natural frequency has a blade-only structural mode, and a difference between a lowest two blade-only structural modes of said first and second natural frequencies being at least 2%.

16. A gas turbine engine comprising: a fan rotor having fan blades received within an outer nacelle; said fan blades being provided with at least a first type having a first natural frequency having blade-only structural modes, and a second type having a second natural frequency having blade-only structural modes, and said fan rotor having a first mount structure intended for said first type and a distinct second mount structure intended for said second type, and said first type of fan blade fitting into the first mount structure intended for said first type, but there being a first obstruction preventing said first type of fan blade from being placed into the second mount structure intended for said second type, and said second type of fan blade fitting into the second mount structure intended for said second type, but there being a second obstruction preventing said second type of fan blade from being placed into the first mount structure intended for said first type; and wherein a difference between a lowest two blade-only structural modes of said first and second natural frequencies being at least 2%.

* * * * *